US010318459B2

(12) United States Patent
Shivanna et al.

(10) Patent No.: US 10,318,459 B2
(45) Date of Patent: Jun. 11, 2019

(54) PERIPHERAL DEVICE SERVER ACCESS

(71) Applicant: Hewlett Packard Enterprise Development LP, Houston, TX (US)

(72) Inventors: Suhas Shivanna, Bangalore (IN); Luis E. Luciani, Jr., Tomball, TX (US); Mohammed Saleem, Bangalore (IN); Andrew Brown, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/327,724

(22) PCT Filed: Apr. 30, 2015

(86) PCT No.: PCT/US2015/028597
§ 371 (c)(1),
(2) Date: Jan. 20, 2017

(87) PCT Pub. No.: WO2016/175847
PCT Pub. Date: Nov. 3, 2016

(65) Prior Publication Data
US 2017/0212856 A1 Jul. 27, 2017

(51) Int. Cl.
G06F 13/38 (2006.01)
G06F 3/06 (2006.01)
G06F 13/42 (2006.01)
G06F 11/34 (2006.01)

(52) U.S. Cl.
CPC ............ *G06F 13/385* (2013.01); *G06F 3/065* (2013.01); *G06F 3/0619* (2013.01); *G06F 3/0679* (2013.01); *G06F 11/3476* (2013.01); *G06F 13/4282* (2013.01)

(58) Field of Classification Search
None
See application file for complete search history.

(56) References Cited

U.S. PATENT DOCUMENTS

| 7,424,419 B1 * | 9/2008 | Fike | G06F 13/385 |
| | | | 703/23 |
| 8,812,746 B2 | 8/2014 | Azam | |
| 8,949,565 B2 | 2/2015 | Khosravi | |

(Continued)

FOREIGN PATENT DOCUMENTS

| WO | WO-2013048477 | 4/2013 | |
| WO | WO 2015101084 A1 * | 7/2015 | .......... G06F 11/1471 |

OTHER PUBLICATIONS

"Intel® Platform Controller Hub EG20T," USB Client Driver for Windows * Programmer's Guide, Mar. 2011, 24 Pgs.

(Continued)

*Primary Examiner* — Steven G Snyder
(74) *Attorney, Agent, or Firm* — Hewlett Packard Enterprise Patent Department

(57) ABSTRACT

Example implementations relate to a server including a platform controller hub (PCH), where the PCH includes a peripheral device manager, a management processor coupled to the peripheral device manager, and a peripheral device interface to couple with a peripheral device and provide out of band access of the peripheral device via the management processor and peripheral device manager to a memory of the server.

11 Claims, 3 Drawing Sheets

(56) References Cited

U.S. PATENT DOCUMENTS

| | | | |
|---|---|---|---|
| 9,710,045 B2* | 7/2017 | Li | G06F 1/3209 |
| 9,912,474 B2* | 3/2018 | Gupta | H04L 9/0825 |
| 10,002,003 B2* | 6/2018 | Zhang | G06F 9/445 |
| 2008/0005446 A1* | 1/2008 | Frantz | G06F 13/107 |
| | | | 710/313 |
| 2008/0060068 A1 | 3/2008 | Mabayoje et al. | |
| 2008/0077711 A1* | 3/2008 | Cepulis | G06F 9/4406 |
| | | | 709/250 |
| 2011/0161551 A1 | 6/2011 | Khosravi et al. | |
| 2011/0161721 A1 | 6/2011 | Fulginiti | |
| 2012/0317175 A1 | 12/2012 | Husain et al. | |
| 2013/0151841 A1 | 6/2013 | McGraw | |
| 2013/0179671 A1 | 7/2013 | Tsai | |
| 2013/0339938 A1* | 12/2013 | He | G06F 8/65 |
| | | | 717/168 |
| 2014/0032978 A1* | 1/2014 | Huang | G06F 11/3409 |
| | | | 714/47.2 |
| 2014/0089693 A1* | 3/2014 | Ooi | G06F 1/3206 |
| | | | 713/320 |
| 2014/0156895 A1 | 6/2014 | Chandrasekaran | |
| 2015/0278068 A1* | 10/2015 | Swanson | G06F 11/3476 |
| | | | 713/2 |
| 2015/0304233 A1* | 10/2015 | Krishnamurthy | H04L 47/762 |
| | | | 709/226 |
| 2015/0355699 A1* | 12/2015 | Castro-Leon | G06F 1/30 |
| | | | 713/322 |
| 2016/0283424 A1* | 9/2016 | Richardson | G06F 13/362 |
| 2016/0366239 A1* | 12/2016 | Rabeela | H04L 67/2819 |
| 2016/0378509 A1* | 12/2016 | Venkatasubba | G06F 9/4411 |
| | | | 713/2 |
| 2017/0010899 A1* | 1/2017 | Dasar | G06F 9/4416 |
| 2017/0108912 A1* | 4/2017 | Li | G06F 1/3209 |
| 2017/0111171 A1* | 4/2017 | Sampathkumar | H04L 9/0891 |
| 2017/0140739 A1* | 5/2017 | Butcher | G09G 5/39 |
| 2017/0277547 A1* | 9/2017 | Zhang | G06F 9/445 |

OTHER PUBLICATIONS

International Searching Authority, The International Search Report and the Written Opinion, PCT/US2015/028597, dated Apr. 22, 2016, 13 Pgs.

Wikipedia, "Out-of-band management", (web page), available online at <https://en.wikipedia.org/w/index.php?title=Out-of-band_managemennt&oldid=640431114>, Dec. 31, 2014, 4 pages.

International Preliminary Report on Patentability received for PCT Application No. PCT/US2015/028597, dated Nov. 9, 2017, 10 pages.

European Search Report and Search Opinion Received for EP Application No. 15890977.0, dated Nov. 23, 2018, 5 pages.

* cited by examiner

PERIPHERAL DEVICE SERVER ACCESS

BACKGROUND

Service processors are processors, or other types of integrated circuits, that are used to manage or co-manage, alongside with or as part of another processor, specific functionality in a computer system. This functionality may include computer system diagnostics, power resource management, and remote computer system configuration and management.

DETAILED DESCRIPTION

Service processors are processors, or other types of integrated circuits, that are used to manage or co-manage, alongside with or as part of another processor, specific functionality in a computer system. Service processors may be employed in conjunction with servers. Servers may rely on a host operating system (OS) being on-line (e.g., function as desired) to function as intended. However, for various reasons, a host OS may go off-line (e.g., not function as intended). In such a case, it may be desirable to access a server associated with the off-line host OS. For example, it may be desirable to retrieve server log information and/or to store recovery firmware in examples where the server too is off-line, among other possibilities. Yet, accessing a server when a host OS and/or the server is off-line may be challenging. For instance, accessing a server when a host OS is off-line and is not powered may be particularly challenging.

Some approaches may employ a host controller such a host universal serial bus (e.g., a USB) controller stored in a management processor and/or a multiplexor in an effort to provide access from a peripheral device to a server. However, such approaches may be costly and/or ineffective (e.g., unable to access a server when an associated host OS is offline and/or not powered), among other difficulties.

Examples in accordance with this disclosure provide peripheral device server access. In various examples, peripheral device server access utilizes a server including a platform controller hub (PCH), where the PCH includes a peripheral device manager, a management processor coupled to the peripheral device manager, and a peripheral device interface to couple with a peripheral device and provide out of band access of the peripheral device via the management processor and peripheral device manager to a memory of the server.

Out of band access to a memory of the server refers to an ability of the peripheral device to communicate with (e.g., to read and/or write to) internal memory (e.g., other management processors and associated internal memory) without using the host OS. Desirably, out of band access to the memory of the server can be provided to the peripheral device even when a host OS associated with the server is off-line and/or the server itself is off-line. However, the present disclosure is not so limited. That is, out of band access can be provided to the peripheral device even when a host OS associated with the server is on-line and/or the server itself is on-line.

Figure 1:
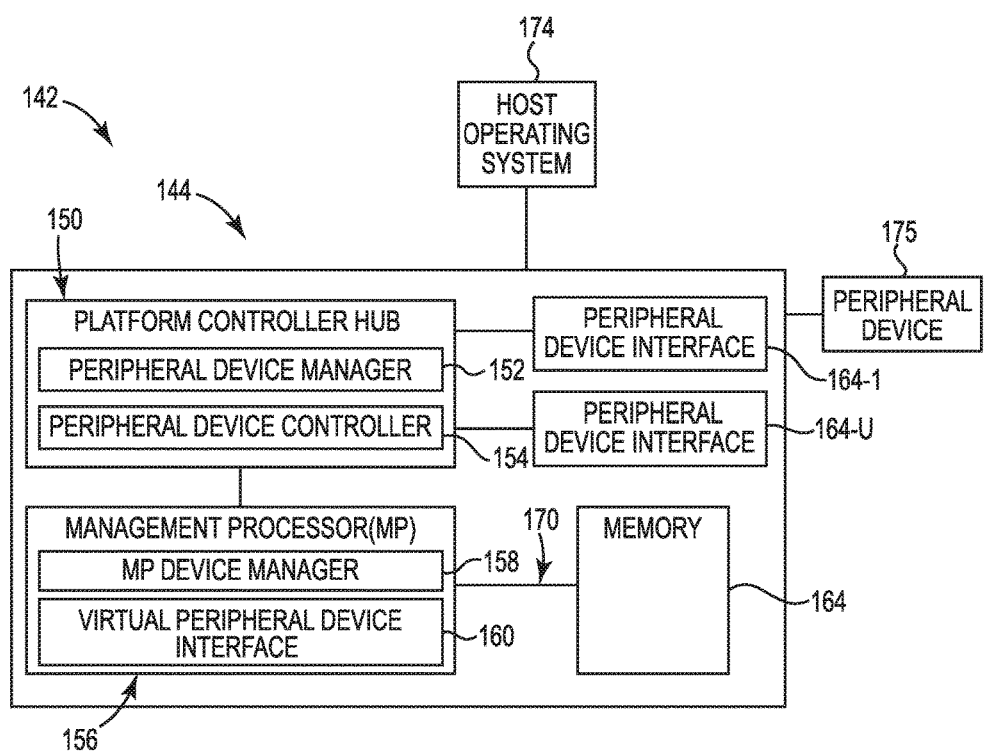
FIG. 1 illustrates a diagram of an example of a system suitable with peripheral device server access according to the present disclosure.

FIG. 1 illustrates a diagram of an example of a system 142 suitable with peripheral device server access according to the present disclosure. As illustrated in FIG. 1, the system 142 can include a server 144, a host OS 174 associated with the server 144, and a peripheral device 175. The server 144 can include a PCH 150, a management processor 156, memory 162, and a number of peripheral device interfaces 164-1, . . . , 164-U.

The peripheral device 175 refers to an electronic device such as a laptop, a cellphone, a USB storage device, and/or a blue-tooth device, among other electronic devices suitable with peripheral device server access, as described herein. The peripheral device 175 can be directly coupled to a peripheral device interface of the peripheral device interfaces 164-1, . . . , 164-U using hardware included in the peripheral device and/or hardware included in the server 144 and/or can be coupled in a wired or wireless manner, for example, via a suitable cable (e.g., a USB compliant cable) or other connection(s) to the peripheral device interface.

The PCH 150 can include a peripheral device manager 152 and a peripheral device controller 154. The peripheral device manager 152 and a peripheral device controller 154 are located in the PCH south bridge. Having the peripheral device controller 154 located in the PCH south bridge can provide a direct connection between the PCH 150 and the peripheral device interfaces 164-1, . . . , 164 and facilitate peripheral device server access, as described herein.

The peripheral device manager 152 can include a computing device. The computing device, as detailed herein with respect to FIG. 2, can be any combination of hardware and program instructions to share information and/or otherwise promote peripheral device server access.

The peripheral device controller 154 refers to a controller such as host controller suitable for use in conjunction with a peripheral device interface of the peripheral device interfaces 164-1, . . . , 164 to communicate with a peripheral device coupled to and/or capable of being coupled to the peripheral device interface. For instance, the peripheral device controller 154 can refer to a USB controller (e.g., a host USB controller) to permit communication with the peripheral device via a USB peripheral device interface. Put another way, in some examples, a peripheral device interface is a USB included in the server 144.

In various examples, the peripheral device 175 can be coupled via a peripheral device interface such as a USB to the PCH 150 of the server 144 directly (i.e., without any intervening components between the peripheral device interface 164-1 and the PCH 150). Such a direct coupling can promote out of band access of the peripheral device 175 via the management processor 156 and the peripheral device manager 152 to the memory 164 of the server 144, as described herein. For example, the peripheral device manager 152 can act as a communication intermediary to permit communication between the peripheral device 175 and the management processor 156 (e.g., a virtual peripheral device (not shown) coupled to a virtual peripheral device interface 160).

While FIG. 1 illustrates a particular number of components the present disclosure is not so limited. That is, a total number of and/or a type of the peripheral device controller 154 and a type of the peripheral device interfaces 164-1, . . . , 164, etc., can be varied to promote communication with peripheral devices such as peripheral device 175. For example, a peripheral device interface of the peripheral device interfaces 164-1, . . . , 164 may by a USB peripheral device interface while another peripheral device interface of the peripheral device interfaces 164-1, . . . , 164 may be a microSD peripheral device interface, among other possibilities.

For various reasons, the host OS 174 may go off-line. Desirably, in some examples, out of band access of the peripheral device 175 via the management processor 156 and the peripheral device manager 152 to the memory 164 of the server 144 can occur when the host OS is off-line. Put another way, the host OS may be off-line when the peripheral device 175 assesses the memory 164 of the server 144, in contrast to other approaches utilizing the host OS to access the memory 175 and/or that rely on the host OS when accessing the memory. Access of the memory 175 without use of the host OS 175, as described herein, may be facilitated in part due to power being provided to various components of the server 144 such as to the PCH 150 and/or the peripheral device manager 152 even when the host OS 174 is off-line and/or not powered. That is, a power supply or power rails to the server 144 may be independent of a power supply to the host OS 174 such that when the host OS 174 is without power the server 144 may remain powered.

In various examples, the peripheral device manager 152 can expose the peripheral device interface such as peripheral device interfaces 164-1, . . . , 164-U to the management processor 156 (e.g., exposing peripheral device interface 164-1 to the management processor 156) among other possibilities to promote peripheral device server access, as described herein. That is, in various examples, a peripheral device interface can couple with a peripheral device 175 and provide out of band access of the peripheral device 175 via the management processor 156 and the peripheral device manager 152 to the memory 164 of the server 144. For instance, server log information can, in various examples, be communicated via a data path 170, as described herein, extending from the non-volatile memory through the management processor and the PCH to the peripheral device.

The management processor 156 includes a management processor device manager 158 and a virtual peripheral device interface 160. The management processor device manager 158 manages a number of virtual peripheral devices (e.g., a virtual USB) (not shown) associated with (e.g., virtualized as being coupled to) the virtual peripheral device interface 160. For example, the management processor device manager 158 can enable and/or disable the virtual peripheral device interface 160 and/or functionality associated therewith alone or in combination with the management processor 156 to authorize communication to and/or from the number of virtual peripheral devices coupled to the virtual peripheral device interface 160 with the peripheral device controller 154.

In some examples, a physical interface (not shown) can couple the PCH 150 (e.g., the peripheral device controller 154) to the management processor 156. For instance, a physical interface (e.g., peripheral component interconnect (PCI), peripheral component interconnect express (PCIe), or other suitable physical interface) can couple the peripheral device controller 154 to the virtual peripheral device 160 and/or couple the peripheral device manager 152 to the management processor device manager 158, among other possibilities to promote peripheral device server access, as described herein.

As mentioned, out of band access to the memory 164 of the server 144 refers to an ability of the peripheral device 175 to communicate with (e.g., to read and/or write to) the memory 164 without using the host OS 174. Desirably, such out of band access can be enabled without having a host controller such a host USB controller stored in a management processor and without a multiplexer as neither component is employed with peripheral device server access, as described herein, even when a host OS and/or the server is off-line. In various examples, exposing a peripheral device interface of the peripheral device interfaces 164-1, . . . , 164-U to the management processor 156 using the peripheral device manager 152 and/or the peripheral device controller 154 included in the PCH can facilitate such out of band access.

The management processor 156 can be a Baseboard Management Controller (BMC) unit and/or an integrated lights out (iLO) unit. The BMC unit can be a specialized microcontroller embedded on the motherboard of the server 144 that manages an interface between system management software and platform hardware. Other types of system firmware such as BIOS can be used to perform the various examples described in this disclosure. That is, actions described as being performed by management processor 156 (e.g., a BMC unit) can be performed by the BIOS and/or other types of system firmware The management processor can be an iLo unit. The iLo unit refers to an intelligent remote management processor integrated in a server to provide information technology (IT) professionals or others with a virtual presence. The IT professional or others may have complete control of the server 144 from a remote site(s) and/or the host OS 174 that is the same or similar to being at the server 144. Features of the iLo may include simplified setup, group configuration, remote power-on/off. Secure Socket Layer (SSL) security, detailed server status, virtual indicators, and diagnostics, in addition to system reboot capability, among other capabilities.

Regardless of whether the management processor 156 is a BMC unit and/or an iLo it is noted that the management processor 156 does not include a host controller (e.g., a host USB controller) in contrast to other approaches that employ of host controller as part of the BMC unit and/or iLO. Desirably, peripheral device server access utilizing the management processor 156 without a host controller provides for an effective, efficient (e.g., utilizing management processors that are not modified with a host controller), and OS agnostic approach to communication with a server.

Figure 2:
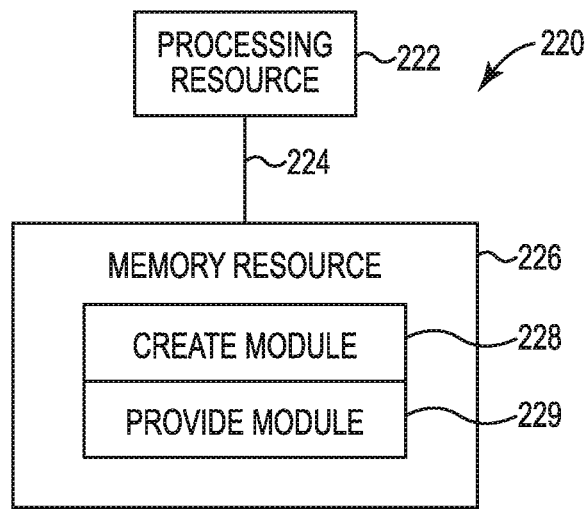
FIG. 2 illustrates a diagram of an example of a peripheral device manager suitable with peripheral device server access according to the present disclosure.

FIG. 2 illustrates a diagram of an example of a peripheral device manager 220 suitable with peripheral device server access according to the present disclosure. The peripheral device manager 220 can include a computing device that can utilize instructions (e.g., software and/or firmware), hardware, and/or logic to perform a number of functions including those described herein. The computing device can be a combination of hardware and program instructions to share information. The hardware, for example, can include a processing resource 222 and/or a memory resource 226 (e.g., CRM, MRM, database, etc.).

The memory resource 226 can be in communication with the processing resource 222. The processing resource 222, as used herein, can include a processor capable of executing instructions stored by a memory resource 226. The processing resource 222 may be implemented in a single device or distributed across multiple devices. The program instructions (e.g., computer readable instructions (CRI)) can include instructions stored on the memory resource 226 and executable by the processing resource 222 to implement a desired function (e.g., create an instance of a virtual peripheral device A memory resource 226, as used herein, can include memory components capable of storing instructions that can be executed by processing resource 222. Such memory resource 226 can be a non-transitory CRM or MRM. Memory resource 226 may be integrated in a single device or distributed across multiple devices. Further, memory resource 226 may be fully or partially integrated in the same device as processing resource 222 or it may be separate but accessible to that device and processing resource 222. Thus, it is noted that the peripheral device manager 220 may be implemented on a on a server (e.g., server 144 as illustrated in FIG. 1) and/or on a collection of server devices, among other possibilities.

The memory resource 226 can be in communication with the processing resource 222 via a communication link (e.g., a path) 224. The communication link 224 can be local or remote to a machine (e.g., a server, a peripheral device manager, and/or a computing device) associated with the processing resource 222. Examples of a local communication link 224 can include an electronic bus internal to a machine (e.g., a server, a peripheral device manager, and/or a computing device) where the memory resource 226 is one of volatile, non-volatile, fixed, and/or removable storage medium in communication with the processing resource 222 via the electronic bus.

A module and/or modules 228, 229 can include CRI that when executed by the processing resource 222 can perform a number of functions including those described herein. The number of modules 228, 229 can be sub-modules of other modules. For example, create module 228 and provide module 229 can be sub-modules and/or contained within the same computing device. In another example, the number of modules 228, 229 can comprise individual modules at separate and distinct locations (e.g., CRM, etc.).

The create module 228 can include instructions that when executed by the processing resource create an instance of a virtual peripheral device. For instance, create module can create an instance of a virtual peripheral device associated with a management processor to form a data path extending from a memory of a server through a virtual peripheral device and a PCH to a peripheral device interface.

The data path (e.g., 170 is illustrated in FIG. 1) interconnects the memory, the management processor, the PCH, and at least one of the peripheral device interfaces to the peripheral device to enable communication (e.g., read and/or write capability) between a peripheral device and the memory and/or the instance of the peripheral device that appears to the peripheral device as being coupled to the virtual peripheral device interface. In some examples, the data path can be formed of a USB (e.g., USB 2.0, USB on the go (OTG), etc.) and/or a serial peripheral interface (SPI) capable component and/or interconnections to provide communication from the peripheral device to the memory and/or the virtual peripheral device interface.

In various examples, the create module 228 can create the virtual peripheral device (i.e., creating an instance of the virtual peripheral device) in response to a peripheral device interface being exposed to a management processor. For instance, in some examples, a peripheral device manager, as described herein, can expose a peripheral device interface to a management processor prior to formation of a data path by the create module 228 and prior to handling communication requests (e.g., data requests from the management processor). In some examples, a visual representation and/or other type of representation of the virtual peripheral device can be displayed via a graphical user interface of the peripheral device. Creation of the virtual peripheral device and/or display of a visual representation of the virtual peripheral device can promote communication of information to and/or from the virtual peripheral device to the peripheral device via the data path.

The provide module 229 can include instructions that when executed by the processing resource provide out of band access, as described herein, of a peripheral device coupled to the peripheral device interface via the data path to the memory of the server. In some examples, the provide module 229 can provide the out of band access without communication to a host OS associated with the server. As discussed, out of band access without communication to the host OS can be desirable, for example, when the host OS is off-line and/or without power.

In various examples, information can be communicated between the peripheral device and the memory of the server via the data path. As mentioned, such communication and subsequent storage, described herein, can occur out of band. For instance, out of band communication can occur between a virtual peripheral device (e.g., utilizing a virtual peripheral device interface) and a peripheral device coupled to a peripheral device interface. Again, such out of band communication can be facilitated via the data path, as described herein. Other approaches employing in band communication (e.g., utilizing the host OS) may not be able to form such a data path, for instance, when the host OS is offline.

In some examples, a store module (not shown) can include instructions that when executed by the processing resource store information communicated via the date path from the peripheral device to the virtual peripheral device in the memory of the server. Such storage can promote various functions such as facilitating diagnosing of the server, backing up server data, and/or restore operations such as downloading a recovery firmware image to the memory of the server, among others.

The store module can, in some examples, include instructions to store information communicated via the data path from the memory of the server to the peripheral device in memory (not shown) associated with the peripheral device. Alternatively or in addition to storage of information communicated to the peripheral device, such communicated information can be displayed on a GUI of the peripheral device. For instance, server log information and/or configuration data associated with the server, among other information, can be displayed on a GUI of the peripheral device. Such display and/or storage of the information communicated via the data path to the peripheral device can promote diagnosing of the server such a storing server log information (e.g., server log files communicated from the memory of the server to the memory associated with the peripheral device when a host OS associated with the server is off-line), backing up server data, and/or restore operations related to the server, among others.

Figure 3:
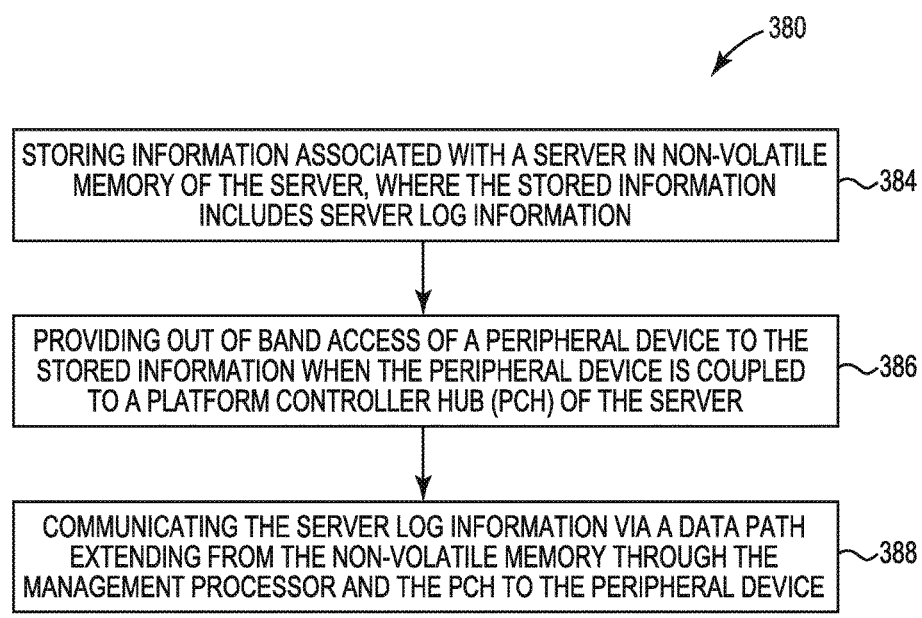
FIG. 3 illustrates a flow diagram of an example of a method suitable with peripheral device server access according to the present disclosure.

FIG. 3 illustrates a flow diagram of an example of a method suitable with peripheral device server access according to the present disclosure. As illustrated in FIG. 3, the method 380 can include storing information associated with a server in non-volatile memory (e.g., a NAND flash memory) of the server, where the stored information includes server log information, as illustrated at 384. However, the present disclosure is not so limited. That is, the stored information can include a variety of information such of version information, recovery images (e.g., recovery firmware images), among other types of information.

As illustrated at 386, the method 380 can include providing out of band access of a peripheral device to the stored information when the peripheral device is coupled to a PCH of the server. Providing out of band access can include causing communication of information to and/or from the memory of the server to the peripheral device (e.g., to and/or from memory associated with the peripheral device). The memory associated with the peripheral device can be a non-volatile memory included in the peripheral device and/or a memory at another location but in communication with the peripheral device (e.g., via a wired or wireless connection to a cloud in communication with the peripheral device).

In some examples, providing the out of band access to the memory of the server can be initiated based upon a peripheral device being coupled to a peripheral device interface (e.g., in response to authentication of a peripheral device coupled to a peripheral device and/or authentication of a user providing identifying user and/or device information via the peripheral device) and/or can be initiated based upon a state of a host OS and/or a state of a server itself. For instance, when a peripheral device is coupled to a peripheral device interface and/or when the server is in an off-line state out of band access of the peripheral device to a memory of the server can be enabled by initializing the peripheral device interface and/or authorizing communication between the peripheral device and the memory of the server along a data path, as described herein. As mentioned, such initializing and authorizing can be performed without communication with the host OS associated with the server.

The method 380 can include communicating the server log information, such as information stored at 384, via a data path extending from the non-volatile memory through the management processor and the PCH to the peripheral device, as illustrated at 388. For example, communicating the server log information can include reading a server log file stored in memory of the server and communicating the server log file and/or information included in the server log file via the data path extending from the non-volatile memory through the management processor and the PCH to the peripheral device.

In some examples, the method 380 can include communicating the server log information to the peripheral device without communication with the host OS associated with the server. Put another way, communication of the server log information to the via the data path extending from the non-volatile memory through the management processor and the PCH to the peripheral device can be performed out of band. Thus, in some examples, the method 380 can include providing the out of band access of the peripheral device to the non-volatile memory of the server without communication with the host OS associated with the server.

In some examples, the method 380 can including creating, via the management processor, a virtual USB to form a portion of the data path. For example, the virtual USB or other type of virtual peripheral device and/or virtual peripheral interface can be created, displayed to a peripheral device coupled to a peripheral device interface, and/or promote communication of information between the memory of the server and the peripheral device. The display of the virtual USB or other type of virtual peripheral device interface can be displayed to a user of the peripheral device as a graphical icon or other visual element on a GUI of the peripheral device to promote peripheral device server access, as described herein. For example, such display can promote communication of information between the memory of the server and the peripheral device.

In the foregoing detailed description of this disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of this disclosure. It is understood that when an element is referred to as being "on," "connected to", "coupled to", or "coupled with" another element, it can be directly on, connected, or coupled with the other element or intervening elements may be present.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of this disclosure. In addition, the proportion and the relative scale of the elements provided in the figures are intended to illustrate the examples of this disclosure, and should not be taken in a limiting sense. Further, as used herein, "a number of" an element and/or feature can refer to one or more of such elements and/or features.

What is claimed:

1. A system, comprising:
    a server including a platform controller hub (PCH), where the PCH includes a peripheral device manager:
    a management processor coupled to the peripheral device manager;
    a peripheral device interface to couple with a peripheral device and provide an out of band access of the peripheral device via the management processor and peripheral device manager to a memory of the server, wherein providing the out of band access to the peripheral device comprises directly communicating the PCH of the server with the peripheral device without intervening components;
    a power supply configured to provide power to the peripheral device interface during the out of band access of the peripheral device when a host operating system associated with the server is off-line, the power supply comprising a power rail for a server component independent from the host operating system, and
    a non-volatile memory of the system to store information associated with the system, wherein the information includes server log information,
    wherein the system is configured to communicate the server log information via a data path extending from the non-volatile memory through the management processor and the PCH to the peripheral device.

2. The system of claim 1, where the management processor is a Baseboard Management Controller (BMC) unit.

3. The system of claim 1, where the management processor is an integrated lights out (iLO) unit.

4. The system of claim 1, where the peripheral device interface is a universal serial bus (USB) interface included in the server, where the peripheral device is coupled via the USB interface to the PCH of the server.

5. The system of claim 1, where the PCH includes a host controller to communicate with the peripheral device and where the management processor does not include a host controller.

6. The system of claim 1, wherein the host operating system is configured to control the server when the host operating system is on-line.

7. A method, comprising:
storing information associated with a server in non-volatile memory of the server, where the information includes server log information;
providing an out of band access of a peripheral device to the information when the peripheral device is coupled to a platform controller hub (PCH) of the server, wherein providing the out of band access of a peripheral device comprises providing, during the out of band access of the peripheral device, a power to a peripheral device interface with a power rail for a server component independent from a host operating system, even when the host operating system is off-line; and
communicating the server log information via a data path extending from the non-volatile memory through a management processor and the PCH to the peripheral device, wherein providing the out of band access to the peripheral device comprises directly communicating the PCH of the server with the peripheral device without intervening components.

8. The method of claim 7, including communicating the server log information to the peripheral device without communication with the host operating system associated with the server.

9. The method of claim 7, including providing the out of band access without communication with host operating system associated with the server.

10. The method of claim 7, including creating, via the management processor, a virtual universal serial bus (USB) interface to form a portion of the data path.

11. The method of claim 7, further comprising communicating with the peripheral device through the host operating system when the host operating system is on-line.

* * * * *